United States Patent
Li et al.

(10) Patent No.: US 12,299,960 B2
(45) Date of Patent: May 13, 2025

(54) EFFICIENCY OF VISION TRANSFORMERS WITH ADAPTIVE TOKEN PRUNING

(71) Applicant: Samsung Electronics Co., Ltd., Suwon-si (KR)

(72) Inventors: Ling Li, Sunnyvale, CA (US); Ali Shafiee Ardestani, Santa Clara, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 381 days.

(21) Appl. No.: 17/978,959

(22) Filed: Nov. 1, 2022

(65) Prior Publication Data

US 2023/0368494 A1    Nov. 16, 2023

Related U.S. Application Data

(60) Provisional application No. 63/340,375, filed on May 10, 2022.

(51) Int. Cl.
*G06V 10/771* (2022.01)
*G06V 10/26* (2022.01)
(Continued)

(52) U.S. Cl.
CPC .......... *G06V 10/771* (2022.01); *G06V 10/273* (2022.01); *G06V 10/764* (2022.01); *G06V 10/776* (2022.01); *G06V 10/82* (2022.01)

(58) Field of Classification Search
CPC .. G06V 10/771; G06V 10/273; G06V 10/764; G06V 10/776; G06V 10/82;
(Continued)

(56) References Cited

U.S. PATENT DOCUMENTS

2021/0089724 A1    3/2021    Uong et al.
2022/0130499 A1    4/2022    Zhou et al.
(Continued)

FOREIGN PATENT DOCUMENTS

CN    111178094 A    5/2020
CN    113887610 A    1/2022
(Continued)

OTHER PUBLICATIONS

Rao Y, Zhao W, Liu B, Lu J, Zhou J, Hsieh CJ. Dynamicvit: Efficient vision transformers with dynamic token sparsification. Advances in neural information processing systems. Dec. 6, 2021;34:13937-49. (Year: 2021).*

(Continued)

*Primary Examiner* — Fayyaz Alam
(74) *Attorney, Agent, or Firm* — Renaissance IP Law Group LLP

(57) ABSTRACT

A system and a method are disclosed for training a vision transformer. A token distillation loss of an input image based on a teacher network classification token and a token importance score of a student network (the vision transformer during training) are determined at a pruning layer of the vision transformer. When a current epoch number is odd, sparsification of tokens of the input image is skipped and the dense input image is processed by layers that are subsequent to the pruning layer. When the current epoch number is even, tokens of the input image are pruned at the pruning layer and processed by layers that are subsequent to the pruning layer. A label loss and a total loss for the input image are determined by the subsequent layers and the student network is updated.

20 Claims, 4 Drawing Sheets

(51) Int. Cl.
*G06V 10/764* (2022.01)
*G06V 10/776* (2022.01)
*G06V 10/82* (2022.01)

(58) Field of Classification Search
CPC . G06T 2207/20081; G06T 2207/20084; G06T 7/00; G06N 3/0895; G06N 3/096; G06N 3/045; G06N 3/082; G06N 3/0464
See application file for complete search history.

(56) References Cited

U.S. PATENT DOCUMENTS

| | | | | |
|---|---|---|---|---|
| 2023/0111306 A1* | 4/2023 | Anand | ............... | G06T 7/0014 382/128 |
| 2023/0153577 A1* | 5/2023 | Kim | ............... | G06N 3/0464 706/27 |
| 2023/0298307 A1* | 9/2023 | Mao | ............... | G06V 10/82 382/155 |

FOREIGN PATENT DOCUMENTS

| | | |
|---|---|---|
| CN | 114037074 A | 2/2022 |
| CN | 114049527 A | 2/2022 |
| CN | 114118402 A | 3/2022 |
| CN | 114139705 A | 3/2022 |
| CN | 114282666 A | 4/2022 |
| CN | 114358279 A | 4/2022 |
| CN | 114462520 A | 5/2022 |
| CN | 114492786 A | 5/2022 |
| WO | 2021239631 A1 | 12/2021 |
| WO | 2022098307 A1 | 5/2022 |

OTHER PUBLICATIONS

Su W, Chen X, Feng S, Liu J, Liu W, Sun Y, Tian H, Wu H, Wang H. Ernie-tiny: A progressive distillation framework for pretrained transformer compression. arXiv preprint arXiv:2106.02241. Jun. 4, 2021. (Year: 2021).*
Yang, Huanrui, et al. "Nvit: Vision transformer compression and parameter redistribution." (2021). (Year: 2021).*
European Extended Search Report for Application No. 23171232.4, mailed Aug. 29, 2023.
Rao, Yongming et al., "Dynamic ViT: Efficient Vision Transformers with Dynamic Token Sparsification," 35th Conference on Neural Information Processing Systems (NeurIPS 2021), 2021, 15 pages.
Atito, Sara et al., "MC-SSL0. 0: Towards Multi-Concept Self-Supervised Learning," arXiv preprint arXiv:2111.15340, https://arxiv.org/abs/2111.15340, Nov. 30, 2021, 17 pages.
Zhang, Jian, "Understanding and Optimizing the Statistical Performance of Machine Learning Models Under Memory Budgets," Stanford University, A Dissertation, https://purl.stanford.edu/pr597hp2122, Dec. 2019, 255 pages.

* cited by examiner

EFFICIENCY OF VISION TRANSFORMERS WITH ADAPTIVE TOKEN PRUNING

CROSS-REFERENCE TO RELATED APPLICATION

This application claims the priority benefit under 35 U.S.C. § 119(e) of U.S. Provisional Application No. 63/340,375, filed on May 10, 2022, the disclosure of which is incorporated herein by reference in its entirety.

TECHNICAL FIELD

The subject matter disclosed herein relates to vision transformers. More particularly, the subject matter disclosed herein relates to a system and a method of training a vision transformer.

BACKGROUND

Convolutional Neural Networks (CNNs) have prompted a rapid development in the computer-vision field. Emerging studies on vision transformers show encouraging results with some vision transformer results surpassing CNN performance in a wide range of tasks, such as classification, semantic segmentation and object detection. To improve model efficiency in CNNs, especially on edge devices, model-compression techniques, such as pruning, quantization, and knowledge distillation have been widely used. For image classification, the number of salient patch tokens varies depending on the difficulty of the input image. Efficient and data-specific token pruning enables effective model acceleration, but efficient and data-specific token pruning is an open question. Sparsity in vision transformers, however, has been explored less. Additionally, typical compression techniques that usually lead to slight accuracy losses are not ideal for accuracy sensitive applications.

SUMMARY

An example embodiment provides a method to train a vision transformer that may include: determining, at a pruning layer P of the vision transformer, a token distillation loss $L_{distill}$ of an input image based on a teacher network classification token $\overline{CLS}$ and a token importance score $TIS^P$ of a student network at the pruning layer P in which the input image may be part of an image database used to train the vision transformer for a predetermined number of epochs, and the student network may include the vision transformer during training; processing the input image by layers of the vision transformer that are subsequent to the pruning layer P by skipping sparsification of tokens of the input image at the pruning layer P based on a current epoch being an odd number; processing the input image by layers of the vision transformer that are subsequent to the pruning layer P by pruning tokens of the input image at the pruning layer P based on the current epoch being an even number; determining a label loss $L_{loss}$ and a total loss L for the input image after processing the input image by layers of the vision transformer that are subsequent to the pruning layer P; and updating the student network of the vision transformer based on the label loss $L_{loss}$ and the total loss L for the input image. In one embodiment, pruning tokens of the input image may include pruning tokens of the input image having a token importance score that is less than a predetermined threshold value. In another embodiment, pruning tokens of the input image may include adaptively pruning tokens of the input image having a token importance score that is less than a predetermined threshold value. In still another embodiment, pruning tokens of the input image may include pruning tokens that are not in a group of a minimum number of highest-weighted tokens having token importance scores that sum to be equal to greater than the predetermined threshold value. In yet another embodiment, pruning tokens of the input image at the pruning layer P prunes tokens of the input image using a token mask M. In one embodiment, the token distillation loss $L_{distill}$ of the input image may be further based on Kullback-Leiber divergence of the teacher network classification token $\overline{CLS}$ and the token importance score $TIS^P$ of the student network. In another embodiment, the pruning layer P may include a third layer of the vision transformer.

An example embodiment provides a vision transformer that may include a first group of layers and a second group of layers. The first group of layers may output a token distillation loss $L_{distill}$ of an input image based on a teacher network classification token $\overline{CLS}$ and a token importance score $TIS^P$ of a student network in which the input image may be part of an image database used to train the vision transformer for a first predetermined number of epochs, and the student network may include the vision transformer during training. The second group of layers that are subsequent to the first group of layers and may be trained by: processing the input image by the second group of layers by skipping sparsification of tokens of the input image within the first group of layers based on a current epoch being an odd number, processing the input image by the second group of layers by pruning tokens of the input image within the first group of layers based on the current epoch being an even number, determining a label loss $L_{loss}$ and a total loss L for the input image after processing the input image by the second group of layers, and updating the student network of the vision transformer based on the label loss $L_{loss}$ and the total loss L for the input image. In one embodiment, pruning tokens of the input image may include pruning tokens of the input image having a token importance score that is less than a predetermined threshold value. In another embodiment, pruning tokens of the input image may include adaptively pruning tokens of the input image having a token importance score that is less than a predetermined threshold value. In still another embodiment, pruning tokens of the input image may include pruning tokens that are not in a group of a minimum number of highest-weighted tokens having token importance scores that sum to be equal to greater than the predetermined threshold value. In yet another embodiment, pruning tokens of the input image may include pruning tokens of the input image using a token mask M. In one embodiment, the token distillation loss $L_{distill}$ of the input image may be further based on Kullback-Leiber divergence of the teacher network classification token $\overline{CLS}$ and the token importance score $TIS^P$ of the student network. In another embodiment, the first group of layers may include a first three layers of the vision transformer.

An example embodiment provides a method to train a vision transformer in which the method may include: determining, at an output of a first group of layers of the vision transformer, a token distillation loss $L_{distill}$ of an input image based on a teacher network classification token $\overline{CLS}$ and a token importance score $TIS^P$ of a student network in which the input image may be part of an image database used to train the vision transformer for a predetermined number of epochs and the student network may be the vision transformer during training; processing the input image by a second group of layers of the vision transformer that are subsequent to the first group of layers by skipping sparsification of tokens of the input image within the first group of layers based on a current epoch being an odd number; processing the input image by the second group of layers by pruning tokens of the input image within the first group of layers using a token mask M based on the current epoch being an even number; determining a label loss $L_{loss}$ and a total loss L for the input image after processing the input image through the second group of layers; and updating the student network of the vision transformer based on the label loss $L_{loss}$ and a total loss L for the input image. In one embodiment, pruning tokens of the input image may include pruning tokens of the input image having a token importance score that is less than a predetermined threshold value. In another embodiment, pruning tokens of the input image may include adaptively pruning tokens of the input image having a token importance score that is less than a predetermined threshold value. In still another embodiment, pruning tokens of the input image may include pruning tokens that are not in a group of a minimum number of highest-weighted tokens having token importance scores that sum to be equal to greater than the predetermined threshold value. In yet another embodiment, the token distillation loss $L_{distill}$ of the input image may be further based on Kullback-Leiber divergence of the teacher network classification token $\overline{CLS}$ and the token importance score $TIS^P$ of the student network. In another embodiment, the first group of layers may include a first three layers of the vision transformer.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
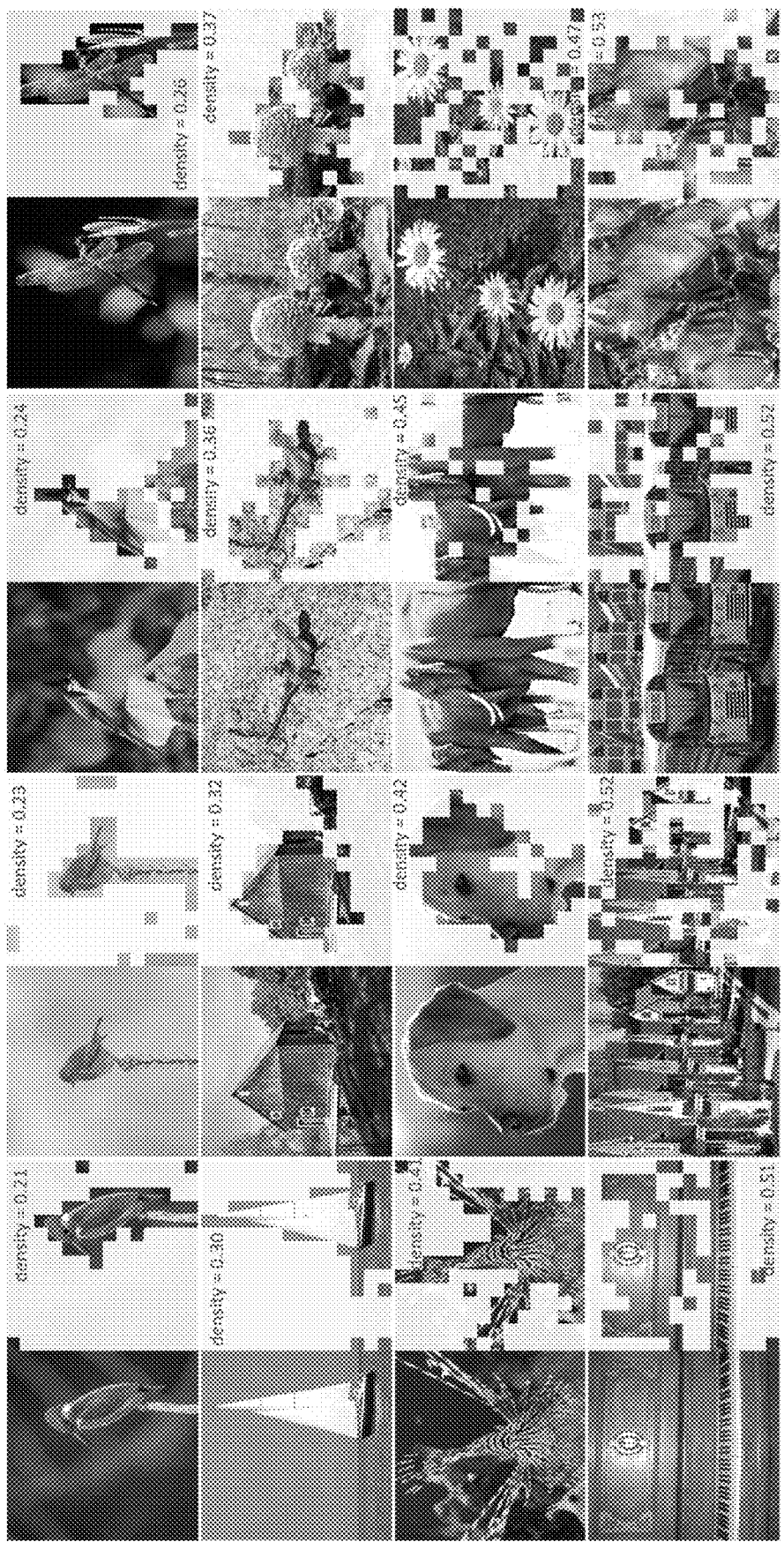
FIG. 1 depicts a visualization of adaptive-pruning technique provided by the general training framework model disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The subject matter disclosed herein provides a general training framework for vision transformers that uses an adaptive token-pruning technique that adjusts the number of preserved tokens for an input image based on the contents of the input image. In one embodiment, the training framework may be used to train a vision transformer model and accompanying weights that accommodates different applications having different accuracies and throughput requirements by providing a simple change of token sparsity within the model on the fly. Additionally, the training framework disclosed herein may achieve a 35% to 43% FLOPs reduction and up to a 91% throughput gain with less than a 0.5% accuracy loss for various vision transformer models. Meanwhile, the same vision-transformer model may also provide a zero accuracy drop option by omitting sparsification.

To improve model efficiency of vision transformers, the intrinsic structure of vision transformers may be leveraged in which input images may be transformed into patch tokens before further processing. Background patch tokens often contribute little to correctly classifying the inputs. Accordingly, there are some "easy" input images that involve a relatively small number of tokens in order to be correctly classified. For example, as shown at the top of FIG. 1, around 20% salient tokens (i.e., a token density=~0.20) of the total number of tokens for the image after sparsification may be sufficient for classifying easy input images, whereas more difficult input images may involve relatively more tokens (i.e., a token density ≥~0.50) after sparsification.

To decrease or avoid data-specific computation on irrelevant patch tokens, the general training framework disclosed herein uses an adaptive token-pruning technique to dynamically adjust the number of preserved tokens. The adaptive token-pruning technique evaluates the importance of each token based on attention weights of earlier layers. Instead of selecting a fixed number of tokens based on the importance score of the tokens, the adaptive token-pruning technique disclosed herein accumulates a variable number of the most important tokens based on a probability-mass threshold. As a result, a resulting vision-transformer model trained by the technique disclosed herein is more computationally efficient without the overhead associated with extra prediction modules used by some existing systems.

Additionally, the general training framework disclosed herein provides a trained unified vision-transformer model that flexibly accommodates different accuracy/throughput requirements on-the-fly. The flexibility may be achieved by simply changing a token density for computation in later layers of the transformer model. While a fully dense vision-transformer model preserves accuracy without model acceleration, a vision-transformer model pruned using the adaptive pruning technique disclosed herein provides different levels of model acceleration with corresponding accuracy trade-offs using the same weights as the fully dense model. Consequently, different applications may use the same vision-transformer model and the same weights for either high accuracy or for a computational speed-up improvement. And, instead of storing a series of different models, the general training framework disclosed herein provides a vision transformer model having an accordingly reduced a memory-footprint size.

To demonstrate the effectiveness of the approach disclosed herein, the general training framework and sparsification technique disclosed herein was deployed on a base Data-efficient image Transformer (DeiT) vision transformer model and a base LV-ViT vision transformer model. The resulting unified model, referred to herein as the Sparse adaptive image Transformer (SaiT), trained using the general training framework allows different levels of sparsification for different computational reductions (35% to 43% FLOP reduction) and up to a 91% throughput gain with less than 0.5% accuracy loss as compared to the base transformer models.

In summary, the subject matter disclosed herein provides three major contributions: 1) a general training framework to obtain a unified model that provides a range of accuracy/throughput tradeoffs; 2) an adaptive-pruning strategy that flexibly adjusts token sparsity based on input images; and 3) knowledge distillation that improves learning token-importance accuracy of early layers.

FIG. 1 depicts a visualization of adaptive-pruning technique provided by the general training framework model disclosed herein. In FIG. 1, an original image and sparsification results of the image are presented next to each other. The densities of patch tokens have been adjusted dynamically from 0.21 (upper left) to 0.53 (lower right) based on the respective difficulties associated with the different images.

As mentioned, the training framework and adaptive token pruning techniques disclosed herein are applicable to general vision transformer architectures. The DeiT and the LV-ViT are example vision-transformer architectures that may be trained using the techniques disclosed herein. Both existing example vision transformers apply an embedding functional block that converts an input image into N patch tokens. The N patch tokens and a classification token CLS then pass through a series of transformer blocks/layers. The feature representation from the last transformer layer is used for final classification. A key aspect of the adaptive token-pruning technique disclosed herein enables earlier layers to effectively capture the importance of each token, thereby reducing computation in later layers.

Figure 2:
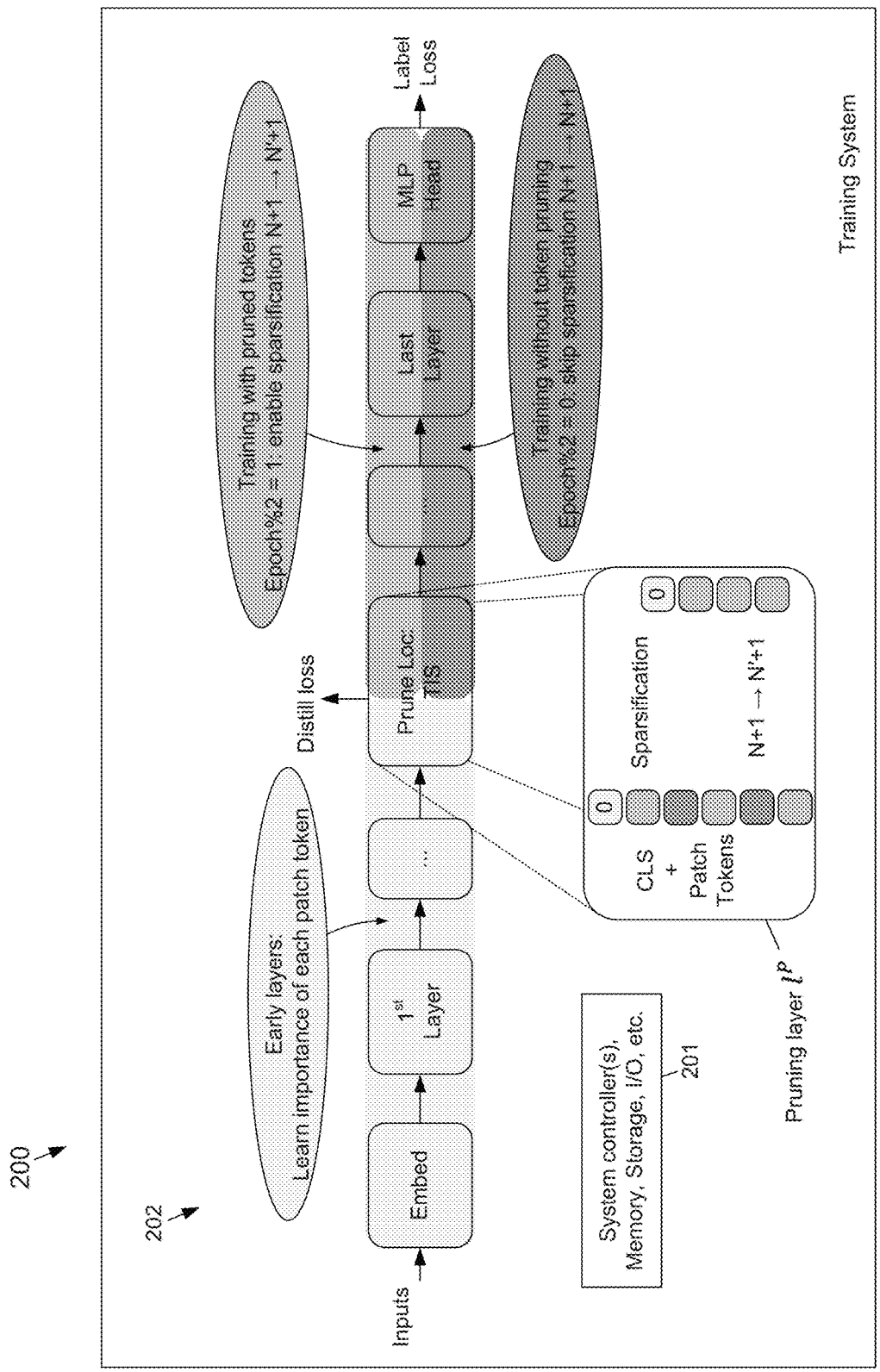
FIG. 2 depicts a block diagram of an example embodiment of a training system that may be used to train a vision transformer model using the adaptive token-pruning technique according to the subject matter disclosed herein.

FIG. 2 depicts a block diagram of an example embodiment of a training system 200 that may be used to train a vision transformer model 202 using the adaptive token-pruning technique according to the subject matter disclosed herein. The training system 200 may include resources 201, such as one or more controller(s), memory, storage, input/output (I/O), etc., that are configured in a well-known manner for vision transformer training. The resources of the training system 200 are not explicitly shown. The vision transformer 202 being trained may include L transformer layers in which the different transformer layers are depicted in FIG. 2 as blocks. In one embodiment, the vision transformer 202 may include, for example, 12 transformer layers. During training, an adaptive-pruning decision is made at a pruning layer $l^P$. In one embodiment, the pruning layer $l^P$ may be the third layer of the vision transformer 202. In alternative embodiment, the pruning layer $l^P$ may be a layer that is different from the third layer.

The training framework disclosed herein trains the vision transformer 200 so that the early transformer layers ($l^0 \sim l^{P-1}$) learn to identify the importance of each patch token. At a designated pruning layer $l^P$, token importance scores (TISs) are extracted based on the attention weights, and are used for token selection and sparsification. The subsequent layers $l^{P+1} \rightarrow l^{L-1}$ are alternately trained using pruned tokens and fully dense tokens (i.e., without pruning).

Figure 3:
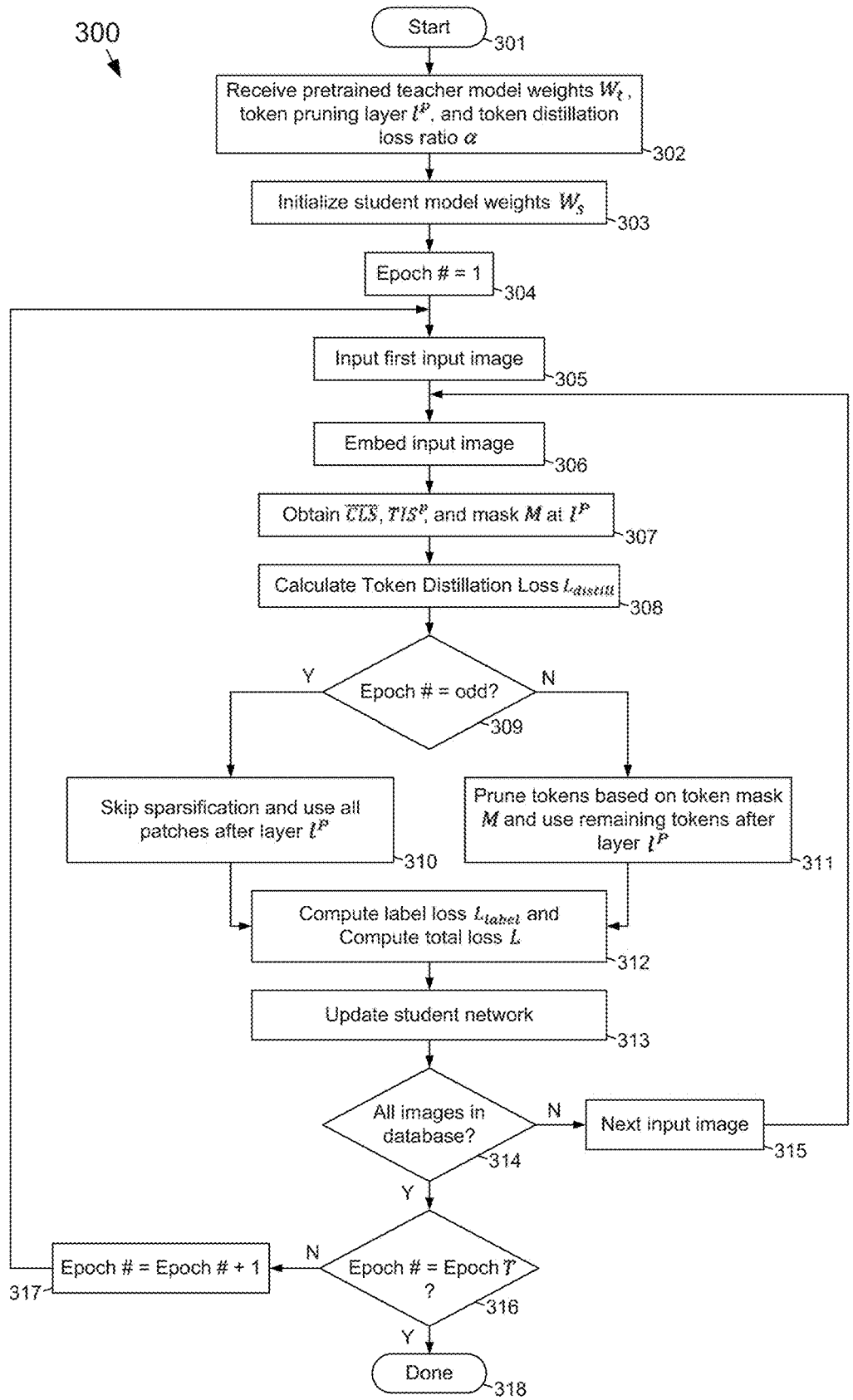
FIG. 3 is a flowchart of an example embodiment of a general training framework according to the subject matter disclosed herein.

FIG. 3 is a flowchart of an example embodiment of a general training framework 300 according to the subject matter disclosed herein. The training framework begins at 301. At 302, the vision transformer 202 (i.e., referred to during training as the student model) receives from the training system 200 pretrained teacher model weights $W_t$, a token pruning layer location $l^P$ and a token distillation loss ratio α from the training system 200. At 303, the weights for the student model are initialized. At 304, the epoch # is initialized to be 1. At 305, a first batch of input images is selected and input to the student model.

At 306, an input image from the selected batch of images is embedded by the student model. At 307, the classification token $\overline{CLS}$ from the last layer of a teacher module, the token importance score for a token at layer $l^P$ are obtained at the pruning layer $l^P$, and used at 308 to calculate the token distillation loss $L_{distill}$. Additionally, a token mask is also obtained M at 307.

At 309, the training system 200 determines whether the epoch # is odd or even. If the epoch # is odd, flow continues to 310 where sparsification is skipped (omitted) at the pruning layer $l^P$ and all image patches are used by transformer layers subsequent to the pruning layer $l^P$. Flow continues to 312 where a label loss $L_{label}$ and a total loss L are computed for the input image.

If, at 309, the training system 200 determines that the epoch # is even, flow continues to 311, where tokens are pruned at the pruning layer $l^P$ using the token mask M. Flow continues to 312 where a label loss $L_{label}$ and a total loss L are computed for the input image.

At 313, the student network is updated based on the computed label loss $L_{label}$ and the total loss L. At 314, the training system 200 determines whether all images of the image database have been used. If not, flow continues to 315 where the next input image is input to the student model. Flow then returns to 306. If, at 314, all images of the image database have been used, flow continues to 316, where the training system 200 determines whether all epochs have been completed. If not, flow continues to 317, where the Epoch # is incremented, and flow returns to 305. If, at 316, all epochs have been completed, flow continues to 318 where the training framework ends.

The following is an example algorithm for the general training framework disclosed herein in pseudocode:
Input: pretrained teacher model $W_t$, token pruning location $l^P$, token distillation ratio β.
Initialize student weights $W_s$.

--- for epoch i = 1 to T do
   Obtain teacher classification token $\overline{CLS}$, student $TIS^P$ and token mask M at layer $l^P$,
   Calculate token distillation loss $L_{distill}$ = KL($TIS^P$, $\overline{CLS}$)
   if i%2 = 0 then
     Skip token sparsification and use all the patch tokens after layer $l^P$
   else
     Prune tokens based on token mask M and use only remaining tokens after layer $l^P$
   end if
   Compute the label loss $L_{label}$ and total loss L = $L_{label}$ + $\alpha L_{distill}$
   Update student network
end for

---

The alternating-training technique enables weight sharing between unpruned patch tokens and sparse (pruned) patch tokens at later layers considering that the weights of the transformer blocks are independent of the number patch tokens. Moreover, the alternating training may improve processing accuracy of later layers on sparse tokens, which may be attributed to the richer data associated with fully dense tokens in training later layers. Training with the alternating framework also preserves model accuracy when skipping sparsification. This approach is different from most prior pruning techniques, which are unable to recover the original model accuracy.

To improve the accuracy of the early layers in learning TIS, the distillation loss is introduced at $l^P$ via knowledge transfer from a teacher model. A self-supervised teacher model may be selected as the teacher for the vision transformer 200 being trained. The self-supervised teacher model may contain explicit semantic segmentation information of an image and thus the teacher model may serve as an ideal teacher model to identify TIS. The distillation loss may be computed using Kullback-Leiber (KL) divergence as:

$$L_{distill} = KL(TIS^{*P} \| \overline{CLS}) \quad (1)$$

in which $$TIS^{*P} = \frac{1}{H}\sum\nolimits_{h=0}^{H}\left(Softmax\left(\sum\nolimits_{m=0}^{N} attn_{h,m,n}^{P}\right)\right).$$

$\overline{CLS}$ is the classification token from the last layer of teacher module backbone averaged across all attention heads. Note that TIS* is slightly different from the TIS, which is defined in Equation 3 below, in order to accommodate the weight distribution in CLS.

Some vision transformers may use MixToken and Token-Labeling, which makes it difficult to apply a teacher model for distillation. Instead, a pre-trained vision transformer and its classification token CLS from the last layer may be used for those types of vision transformers.

Combining the distillation loss with the label loss, the final training loss $L_{tot}$ may be:

$$L_{tot} = L_{label} + \alpha L_{distill} \quad (2)$$

in which $L_{label}$=CrossEntropy(y, ȳ) as the Cross Entropy loss between the model predictions y and the ground truth labels ȳ. The variable a is the distillation loss ratio.

Unlike prior works that rely on explicit token selection modules, which adds extra parameters and processing time, the attention weights are leveraged to extract the TIS for token sparsification. The TIS of Token n at pruning layer $l^P$ may be defined as:

$$TIS_n^P = \frac{W_n^P}{\sum_{i=0}^N W_i^P}, \quad W_n^P = \sum_{h=0}^H \sum_{m=0}^N attn_{h,m,n}^P \quad (3)$$

in which $$attn_{h,m,n}^P = Softmax\left(\frac{QK^T}{\sqrt{d}}\right)$$

is the attention weight for head h, at row m, column n, and layer $l^P$.

Patch Token n is more important if it contributes heavily across all tokens when computing attn×V. Therefore, weight summation across all rows reflects the importance of Patch Token n. Two sparsification strategies may be based on TIS, as value-based and mass-based sparsification.

A first sparsification strategy may be a value-based token selector ($TS_V$) to select a fixed number of tokens (K) based on TIS values, as $$TS_V = top_K(TIS_{n=1:N}^P). \quad (4)$$

For a given target token density ρ, $K=\lceil \rho * +1 \rceil$.

A second sparsification strategy may be a mass-based token selector ($TS_M$) that selects a varying number of tokens based on the distribution of TIS. Given a mass threshold $M_{th}$, this sparsification strategy selects a minimum number of highest-weighted tokens having weights that sum up to or be greater that a threshold, as $$TS_M = top_S(TIS_{n=1:N}^P), \text{ s.t. } \min_S \sum_{i \in TS_M} TIS_i^P >= M_{th}. \quad (5)$$

The patches of input images containing target objects receive higher TIS and the background patches have lower TIS. When small target objects occupy fewer number of patches, the corresponding distribution of TIS tends to be more concentrated, whereas large objects have associated TIS values spread over a larger area. As a result, given a sparsification strategy that is based on a mass threshold $M_{th}$, $TS_M$ is able to adjust the number of selected tokens based on the input image.

To accommodate varying number tokens selected from $TS_M$ for batch training, $TS_M$ may be converted to a binary token mask M, as $$M_n = \begin{cases} 1 & n \in TS_M \\ 0 & n \notin TS_M \end{cases}, \forall n \in [1:N]. \quad (6)$$

Accordingly, an attention module may be modified to perform the all-to-all attention only on the remaining tokens after sparsification by setting attention weights related to pruned tokens to negative infinity, as $$QK^T = \begin{cases} QK_{h,m,:}^T = -inf & \text{if } M_m \neq 0 \\ QK_{h,:,n}^T = -inf & \text{if } M_n \neq 0 \\ QK_{h,m,n}^T & \text{if } M_m \neq 0 \text{ and } M_n \neq 0 \end{cases} \quad (7)$$

in which $QK_{h,m,n}^T$ is the element at head h, row m, and column n for the product of Query (Q) and Key (K). The elements of unpruned tokens remain the same while elements of pruned tokens are set to negative infinity (in practice set to −65,000). Considering attn=Softmax($QK^T$), this sets all the attention weights (columns and rows) corresponding to pruned tokens to zeros. Subsequently, the pruned tokens are all zeros in the feature maps resulting from attn×V.

Figure 4:
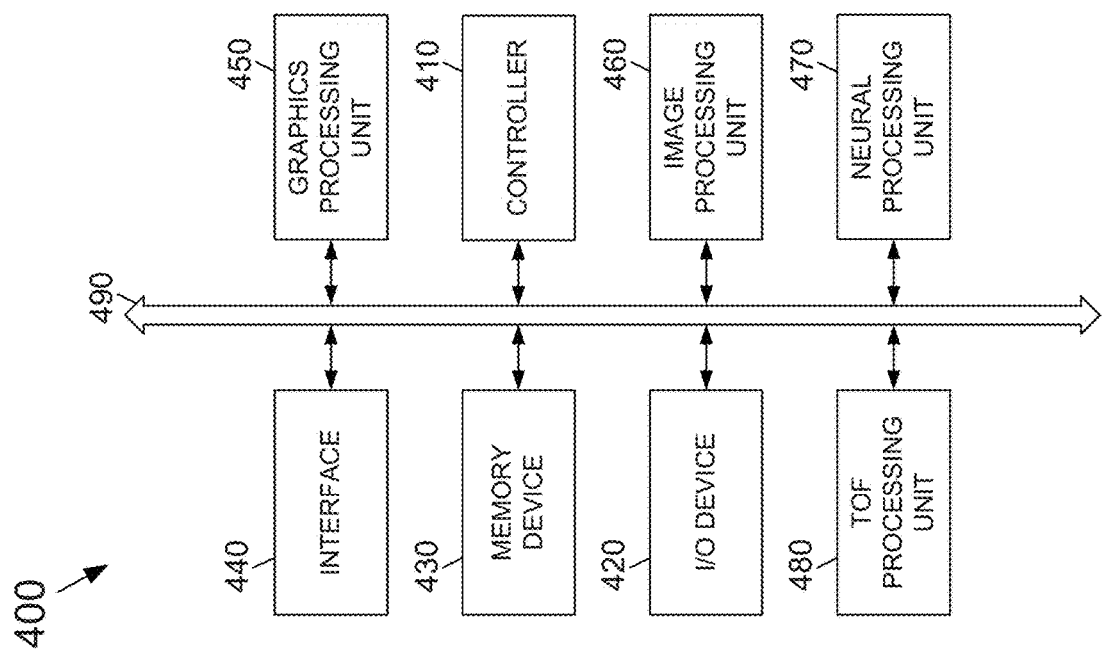
FIG. 4 depicts an electronic device that may be configured to train a vision transformer using the general training framework disclosed herein.

FIG. 4 depicts an electronic device 400 that may be configured to train a vision transformer using the general training framework disclosed herein. Alternatively, the electronic device 400 may be configured as a vision transformer that has been trained using the general training framework disclosed herein. Electronic device 400 and the various system components of electronic device 400 may be formed from one or modules. The electronic device 400 may include a controller (or CPU) 410, an input/output device 420 such as, but not limited to, a keypad, a keyboard, a display, a touch-screen display, a 2D image sensor, a 3D image sensor, a memory 430, an interface 440, a GPU 450, an imaging-processing unit 460, a neural processing unit 470, a TOF processing unit 480 that are coupled to each other through a bus 490. In one embodiment, the 2D image sensor and/or the 3D image sensor may be part of the imaging processing unit 460. In another embodiment, the 3D image sensor may be part of the TOF processing unit 480. The controller 410 may include, for example, at least one microprocessor, at least one digital signal processor, at least one microcontroller, or the like. The memory 430 may be configured to store a command code to be used by the controller 410 and/or to store a user data. In one embodiment, the neural processing unit 470 may be configured as part of a vision transformer that has been trained using the general training framework disclosed herein.

The interface 440 may be configured to include a wireless interface that is configured to transmit data to or receive data from, for example, a wireless communication network using a RF signal. The wireless interface 440 may include, for example, an antenna. The electronic system 400 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to train a vision transformer, the method comprising:
determining, at a pruning layer P of the vision transformer, a token distillation loss $L_{distill}$ of an input image based on a teacher network classification token $\overline{CLS}$ and a token importance score $TIS^P$ of a student network at the pruning layer P, the input image being part of an image database used to train the vision transformer for a predetermined number of epochs, and the student network comprising the vision transformer during training;
processing the input image by layers of the vision transformer that are subsequent to the pruning layer P by skipping sparsification of tokens of the input image at the pruning layer P based on a current epoch being an odd number;
processing the input image by layers of the vision transformer that are subsequent to the pruning layer P by pruning tokens of the input image at the pruning layer P based on the current epoch being an even number;
determining a label loss $L_{loss}$ and a total loss L for the input image after processing the input image by layers of the vision transformer that are subsequent to the pruning layer P; and
updating the student network of the vision transformer based on the label loss $L_{loss}$ and the total loss L for the input image.

2. The method of claim 1, wherein pruning tokens of the input image comprises pruning tokens of the input image having a token importance score that is less than a predetermined threshold value.

3. The method of claim 1, wherein pruning tokens of the input image comprises adaptively pruning tokens of the input image having a token importance score that is less than a predetermined threshold value.

4. The method of claim 3, wherein pruning tokens of the input image comprises pruning tokens that are not in a group of a minimum number of highest-weighted tokens having token importance scores that sum to be equal to greater than the predetermined threshold value.

5. The method of claim 1, wherein pruning tokens of the input image at the pruning layer P prunes tokens of the input image using a token mask M.

6. The method of claim 1, wherein the token distillation loss $L_{distill}$ of the input image is further based on Kullback-Leiber divergence of the teacher network classification token $\overline{CLS}$ and the token importance score $TIS^P$ of the student network.

7. The method of claim 1, wherein the pruning layer P comprises a third layer of the vision transformer.

8. A vision transformer, comprising
a first group of layers outputs a token distillation loss $L_{distill}$ of an input image based on a teacher network classification token $\overline{CLS}$ and a token importance score $TIS^P$ of a student network, the input image being part of an image database used to train the vision transformer for a first predetermined number of epochs, and the student network comprising the vision transformer during training; and a second group of layers that are subsequent to the first group of layers that are trained by:
  processing the input image by the second group of layers by skipping sparsification of tokens of the input image within the first group of layers based on a current epoch being an odd number,
  processing the input image by the second group of layers by pruning tokens of the input image within the first group of layers based on the current epoch being an even number,
  determining a label loss $L_{loss}$ and a total loss L for the input image after processing the input image by the second group of layers, and
  updating the student network of the vision transformer based on the label loss $L_{loss}$ and the total loss L for the input image.

9. The vision transformer of claim 8, wherein pruning tokens of the input image comprises pruning tokens of the input image having a token importance score that is less than a predetermined threshold value.

10. The vision transformer of claim 8, wherein pruning tokens of the input image comprises adaptively pruning tokens of the input image having a token importance score that is less than a predetermined threshold value.

11. The vision transformer of claim 10, wherein pruning tokens of the input image comprises pruning tokens that are not in a group of a minimum number of highest-weighted tokens having token importance scores that sum to be equal to greater than the predetermined threshold value.

12. The vision transformer of claim 8, wherein pruning tokens of the input image comprises pruning tokens of the input image using a token mask M.

13. The vision transformer of claim 8, wherein the token distillation loss $L_{distill}$ of the input image is further based on Kullback-Leiber divergence of the teacher network classification token $\overline{CLS}$ and the token importance score $TIS^P$ of the student network.

14. The vision transformer of claim 8, wherein the first group of layers comprises a first three layers of the vision transformer.

15. A method to train a vision transformer, the method comprising:

determining, at an output of a first group of layers of the vision transformer, a token distillation loss $L_{distill}$ of an input image based on a teacher network classification token $\overline{CLS}$ and a token importance score $TIS^P$ of a student network, the input image being part of an image database used to train the vision transformer for a predetermined number of epochs, and the student network comprising the vision transformer during training;

processing the input image by a second group of layers of the vision transformer that are subsequent to the first group of layers by skipping sparsification of tokens of the input image within the first group of layers based on a current epoch being an odd number;

processing the input image by the second group of layers by pruning tokens of the input image within the first group of layers using a token mask M based on the current epoch being an even number;

determining a label loss $L_{loss}$ and a total loss L for the input image after processing the input image through the second group of layers; and updating the student network of the vision transformer based on the label loss $L_{loss}$ and a total loss L for the input image.

16. The method of claim 15, wherein pruning tokens of the input image comprises pruning tokens of the input image having a token importance score that is less than a predetermined threshold value.

17. The method of claim 15, wherein pruning tokens of the input image comprises adaptively pruning tokens of the input image having a token importance score that is less than a predetermined threshold value.

18. The method of claim 17, wherein pruning tokens of the input image comprises pruning tokens that are not in a group of a minimum number of highest-weighted tokens having token importance scores that sum to be equal to greater than the predetermined threshold value.

19. The method of claim 15, wherein the token distillation loss $L_{distill}$ of the input image is further based on Kullback-Leiber divergence of the teacher network classification token $\overline{CLS}$ and the token importance score $TIS^P$ of the student network.

20. The method of claim 15, wherein the first group of layers comprises a first three layers of the vision transformer.

* * * * *